United States Patent
Gardner et al.

(10) Patent No.: US 9,357,881 B2
(45) Date of Patent: Jun. 7, 2016

(54) OIL LEVEL DETECTION SYSTEM FOR DEEP FAT FRYER

(71) Applicant: Pitco Frialator, Inc., Concord, NH (US)

(72) Inventors: John P. Gardner, Franklin, NH (US); Steven J. Savage, Concord, NH (US)

(73) Assignee: PITCO FRIALATOR, INC., Concord, NH (US)

( * ) Notice: Subject to any disclaimer, the term of this patent is extended or adjusted under 35 U.S.C. 154(b) by 371 days.

(21) Appl. No.: 13/804,124

(22) Filed: Mar. 14, 2013

(65) Prior Publication Data

US 2013/0295245 A1 Nov. 7, 2013

Related U.S. Application Data (60) Provisional application No. 61/618,780, filed on Mar. 31, 2012, provisional application No. 61/619,389, filed on Apr. 2, 2012.

(51) Int. Cl.
*G01F 23/00* (2006.01)
*A47J 37/12* (2006.01)
*G01F 23/24* (2006.01)

(52) U.S. Cl.
CPC ........... *A47J 37/1266* (2013.01); *G01F 23/246* (2013.01); *G01F 23/247* (2013.01); *G01F 23/248* (2013.01)

(58) Field of Classification Search
CPC ..... G01F 23/22; G01F 23/246; G01F 23/247; G01F 23/48
USPC .......................................................... 73/295
See application file for complete search history.

(56) References Cited

U.S. PATENT DOCUMENTS

| | | | |
|---|---|---|---|
| 2,578,129 A | 12/1951 | Daugherty |
| 2,686,250 A | 8/1954 | Schroeder |
| 2,698,092 A | 12/1954 | Morton |
| 3,410,199 A | 11/1968 | Quednau |
| 3,466,997 A | 9/1969 | Hartzog |
| 3,648,595 A | 3/1972 | Morris |

(Continued)

FOREIGN PATENT DOCUMENTS

| | | |
|---|---|---|
| DE | 35 27 868 A1 | 8/1985 |
| DE | 36 03 539 A1 | 8/1987 |

(Continued)

OTHER PUBLICATIONS

International Search Report and Opinion for PCT/US2013/033069, dated Sep. 16, 2013, 12 pp.

(Continued)

*Primary Examiner* — Hezron E Williams
*Assistant Examiner* — Rodney T Frank
(74) *Attorney, Agent, or Firm* — Brinks Gilson & Lione (57) ABSTRACT

A detector configured to indirectly monitor a level of liquid within a container is provided. The detector includes a temperature sensor and a heat producing element proximate to the temperature sensor. A shell is disposed around the temperature sensor and heat producing element, the shell is configured to be disposed within a container and to provide a barrier between liquid disposed within the container and each of the temperature sensor and heat producing element. The heat producing element is configured to transfer heat generated therein to the shell, and the sensor is configured to measure a surface temperature of the heat producing element.

26 Claims, 4 Drawing Sheets

(56) References Cited

U.S. PATENT DOCUMENTS

| | | | |
|---|---|---|---|
| 3,667,373 A | 6/1972 | Sicher et al. | |
| 3,701,313 A | 10/1972 | Boggs | |
| 3,797,378 A | 3/1974 | Morris | |
| 3,809,062 A | 5/1974 | Moore et al. | |
| 3,894,482 A | 7/1975 | Murphy | |
| 4,050,447 A | 9/1977 | Terracciano | 126/374 |
| 4,324,173 A | 4/1982 | Moore et al. | |
| 4,325,491 A | 4/1982 | Barnhill | |
| 4,437,159 A | 3/1984 | Waugh | |
| 4,457,947 A | 7/1984 | Schmidt et al. | |
| 4,478,140 A | 10/1984 | Bullock | |
| 4,487,691 A | 12/1984 | Panora | |
| 4,488,478 A | 12/1984 | Leeper | 99/330 |
| 4,489,646 A | 12/1984 | Schmidt et al. | |
| 4,489,647 A | 12/1984 | Stamps et al. | 99/336 |
| 4,502,373 A | 3/1985 | Keating | |
| 4,593,170 A | 6/1986 | Maeda et al. | |
| 4,599,990 A | 7/1986 | Fritzsche et al. | |
| 4,623,544 A | 11/1986 | Highnote | |
| 4,672,540 A | 6/1987 | Waugh et al. | |
| 4,722,267 A | 2/1988 | Galockin et al. | 99/357 |
| 4,748,902 A | 6/1988 | Maurantonio | |
| 4,768,426 A | 9/1988 | Nett | |
| 4,798,939 A | 1/1989 | Nett | |
| 4,826,590 A | 5/1989 | Turman | |
| 4,858,119 A | 8/1989 | Waugh et al. | |
| 4,877,386 A | 10/1989 | Hinds et al. | |
| 4,945,893 A | 8/1990 | Manchester | |
| 5,033,368 A | 7/1991 | Brewer | |
| 5,044,764 A | 9/1991 | Aoki et al. | |
| 5,052,288 A | 10/1991 | Marquez et al. | |
| 5,069,116 A | 12/1991 | Marquez et al. | 99/330 |
| 5,174,153 A | 12/1992 | Nakano | |
| 5,234,527 A | 8/1993 | Nozawa et al. | |
| 5,240,725 A | 8/1993 | Akamatsu et al. | 426/233 |
| 5,249,510 A | 10/1993 | Rozak et al. | |
| 5,249,511 A | 10/1993 | Shumate et al. | |
| 5,263,406 A | 11/1993 | Chiu | |
| 5,325,766 A | 7/1994 | Mareels | 99/537 |
| 5,329,343 A * | 7/1994 | Saito | 399/70 |
| 5,404,796 A | 4/1995 | Campbell et al. | |
| 5,445,062 A | 8/1995 | Polster | |
| 5,490,449 A | 2/1996 | Meister et al. | |
| 5,568,765 A | 10/1996 | Andoh et al. | 99/403 |
| 5,586,486 A | 12/1996 | Nitschke et al. | 99/330 |
| 5,597,601 A | 1/1997 | Griffin | |
| 5,617,777 A | 4/1997 | Davis et al. | 99/408 |
| 5,706,717 A | 1/1998 | Barner | 99/330 |
| 5,730,026 A | 3/1998 | Maatuk | |
| 5,776,530 A | 7/1998 | Davis et al. | 426/233 |
| 5,782,164 A | 7/1998 | Brintle | |
| 5,812,060 A | 9/1998 | DeSpain et al. | 340/618 |
| 5,827,556 A * | 10/1998 | Maher, Jr. | 426/233 |
| 5,870,945 A | 2/1999 | Bivens | |
| 5,881,207 A | 3/1999 | DeBourg et al. | |
| 5,896,810 A | 4/1999 | Barbour | |
| 5,942,269 A | 8/1999 | Casey et al. | 426/233 |
| 5,973,297 A | 10/1999 | Winter et al. | |
| 5,974,951 A | 11/1999 | Kovacs | |
| 6,009,794 A | 1/2000 | Casey et al. | |
| 6,057,772 A | 5/2000 | Burkett | |
| 6,063,421 A | 5/2000 | Barravecchio | 426/231 |
| 6,202,543 B1 | 3/2001 | Moya et al. | |
| 6,254,790 B1 | 7/2001 | King et al. | |
| 6,363,840 B1 | 4/2002 | Song | |
| 6,427,583 B1 | 8/2002 | Shimansky et al. | 99/404 |
| 6,470,794 B2 | 10/2002 | Takahashi | |
| 6,568,263 B1 * | 5/2003 | Snelling | 73/295 |
| 6,629,645 B2 | 10/2003 | Mountford et al. | |
| 6,745,669 B2 | 6/2004 | Suzuki | |
| 6,777,009 B1 | 8/2004 | Shealy | |
| 6,783,685 B2 | 8/2004 | Hwang | |
| 6,883,419 B2 | 4/2005 | Suzuki | |
| 6,935,223 B2 | 8/2005 | Kobayashi | |
| 6,958,166 B2 | 10/2005 | Taylor | 426/233 |
| 7,015,433 B2 | 3/2006 | Rado et al. | |
| 7,309,422 B2 | 12/2007 | Mullaney, Jr. | |
| 7,322,278 B2 | 1/2008 | Mercer et al. | 99/333 |
| 7,891,289 B2 | 2/2011 | Day et al. | 99/404 |
| 8,438,919 B2 * | 5/2013 | Phillips et al. | 73/295 |
| 2002/0011105 A1 * | 1/2002 | Snelling et al. | 73/295 |
| 2002/0026875 A1 | 3/2002 | Chikazawa et al. | |
| 2002/0035931 A1 | 3/2002 | Tschopp et al. | |
| 2002/0069767 A1 | 6/2002 | Wendel et al. | |
| 2003/0047084 A1 | 3/2003 | Shandross | |
| 2004/0060452 A1 | 4/2004 | Suzuki | |
| 2004/0107957 A1 | 6/2004 | Nishida et al. | |
| 2004/0112225 A1 | 6/2004 | Mercer et al. | |
| 2004/0144258 A1 | 7/2004 | Kobayashi | |
| 2004/0231837 A1 | 11/2004 | Zank et al. | 166/125 |
| 2005/0072309 A1 | 4/2005 | Mullaney, Jr. | |
| 2005/0194372 A1 | 9/2005 | Lau et al. | |
| 2005/0284823 A1 | 12/2005 | Fall et al. | |
| 2006/0011613 A1 | 1/2006 | Rado et al. | |
| 2006/0042375 A1 | 3/2006 | Davis | |
| 2006/0130670 A1 | 6/2006 | Johnson et al. | |
| 2008/0121115 A1 | 5/2008 | Tiszai et al. | 99/334 |
| 2008/0121578 A1 | 5/2008 | Burkett et al. | |
| 2008/0213446 A1 | 9/2008 | Feinberg et al. | |
| 2008/0229934 A1 | 9/2008 | Theodos et al. | 99/330 |
| 2008/0250798 A1 | 10/2008 | Okoren et al. | |
| 2008/0282905 A1 | 11/2008 | Savage et al. | |
| 2009/0039004 A1 | 2/2009 | Andersen | 210/167.28 |
| 2009/0084273 A1 | 4/2009 | Lackman et al. | |
| 2013/0295245 A1 | 11/2013 | Gardner et al. | |

FOREIGN PATENT DOCUMENTS

| | | |
|---|---|---|
| DE | 37 42 783 A1 | 12/1987 |
| DE | 42 32 043 A1 | 9/1992 |
| EP | 0 210 509 A1 | 7/1986 |
| EP | 2 037 233 A1 | 3/2009 |
| FR | 2 697 985 A1 | 5/1994 |
| FR | 2 733 586 A1 | 10/1996 |
| JP | 11-237356 | 8/1999 |
| KR | 10-1998-0000308 | 3/1998 |
| KR | 10-1998-025392 A | 7/1998 |
| NL | 278 057 A1 | 12/1988 |
| WO | WO 83/00765 | 3/1983 |

OTHER PUBLICATIONS

International Preliminary Report on Patentability and Written Opinion of the International Searching Authority, dated Oct. 1, 2014, 9 pp.
Supplementary European Search Report for PCT/US2013/033069, dated Jul. 8, 2015, 6 pp.
GE Measurement & Control, NTC Type NK Thermometrics Epoxy-Coated Chip Thermistor, www.ge-mcs.com, 920-5738, 2 pp.
Copyright Statement, XS, CPRTENFRDE, 1 p.
Communication from EP with Extended European Search Report, dated Sep. 30, 2015, 13 pp.
Communication from the EPO regarding application No. 13770122.3, with supplemental European Search Report, dated Sep. 30, 2015, 14 pp.

* cited by examiner

OIL LEVEL DETECTION SYSTEM FOR DEEP FAT FRYER

CROSS-REFERENCE TO RELATED APPLICATIONS

This application claims priority from U.S. Provisional Application No. 61/618,780 filed on Mar. 31, 2012 and from U.S. Provisional Application No. 61/619,389 filed on Apr. 2, 2012, the entirety of each are hereby fully incorporated by reference herein.

TECHNICAL FIELD

The subject disclosure relates to commercial deep fat fryers or other pieces of restaurant or industrial equipment where a heated liquid is maintained within a normal band. Conventional level detectors, such as floats and the like are known to have various drawbacks.

BRIEF SUMMARY

A first representative embodiment of the disclosure provides a deep fat fryer with a liquid level detection system. The fryer includes a vat suitable to hold a volume of cooking liquid. The vat is in thermal communication with a heat source that is configured to provide heat to the cooking liquid when disposed within the vat. A liquid level detector is disposed within the vat, the liquid level detector comprises a heat producing element and a temperature sensor disposed proximate to the heat producing element and configured to provide a first output signal representative of a surface temperature of the heat producing element.

A second representative embodiment of the disclosure provides a detector configured to indirectly monitor a level of liquid within a container. The detector includes a temperature sensor and a heat producing element proximate to the temperature sensor. A shell is disposed around the temperature sensor and heat producing element. The shell is configured to be disposed within a container and to provide a barrier between liquid disposed within the container and each of the temperature sensor and heat producing element. The heat producing element is configured to transfer heat generated therein to the shell, and the sensor is configured to measure a surface temperature of the heat producing element.

A third representative embodiment of the disclosure provides a method of controlling a level of liquid within a cooking vat. The method includes the steps of providing a vat configured to receive a volume of liquid and providing a liquid level detector within the vat. The liquid level detector comprises a heat producing element and a temperature sensor disposed proximate to the heat producing element and configured to provide a first output signal representative of a surface temperature of the heat producing element. The method further comprises the step of providing a controller that selectively energizes and deenergizes the heat producing element, and receives the first output signal. Further the method includes energizing the heat producing element and deenergizing the heat producing element after the first output signal reaches either a predetermined value or a substantially steady state value. The method then measures the rate of change of the first output signal after the heat producing element is deenergized, compares the measured rate of change of the first output signal with a reference value range, and then determines the presence or absence of liquid proximate to the liquid level detector based upon the comparison between the measured rate of change of the first output signal and the reference value range.

Advantages of the disclosed system will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Turning now to FIGS. 1-6, a cooking liquid level detection system 1 is provided. The cooking level detection system 1 includes a liquid level detector that is normally disposed within, or extending into, a container that houses a volume of cooking liquid. In some embodiments, the container may be a vat 20 that is disposed upon a commercial deep fat fryer 10, as shown schematically in FIG. 1. In other embodiments, the liquid level detector may be disposed within other types of containers associated with other cooking appliances (or for that matter other types of machines) where the level of cooking liquid (or other liquid disposed within the container) is normally heated above ambient temperature and is normally preferably maintained above a specific level of the container, or within a specific level range. As will be readily appreciated by one of ordinary skill in the art upon review of the instant specification and drawings, the cooking level detection system is readily utilized with a deep fat fryer where cooking liquid, such as oil, is continuously lost from the vat due to being soaked within the food product being cooked therewithin. Accordingly, the oil level within the cooking vat of conventional fryers must be periodically manually monitored during periods of heavy use and the kitchen operators must often manually fill the cooking vat with fresh oil. The instant cooking level detection system provides for an automatic signal that oil level has dropped below a certain level (which can be set by the manufacturer or positioned by the user), which allows for automatic refilling of the oil into the vat, or for an alarm to the kitchen operator that oil needs to be added to the vat.

For the sake of brevity, the cooking level detection system is discussed below with respect to use with a commercial deep fat fryer 10. Examples of other equipment that may benefit from the cooking level detection system disclosed herein are rethermalizers, pasta cookers, and the like, and one of ordinary skill in the art would readily understand any appropriate modifications to the system disclosed herein for application with other equipment that could benefit from this system, with a careful review of the instant specification and figures. The fryer 10 used with the cooking level detection system may be a conventional fryer (shown schematically in FIG. 1), with a housing 12 that supports a vat 20. The fryer 10 includes a heater 18 (either an electrical or gas burner) to continuously or cyclically provide heat to the cooking liquid Z (FIGS. 3, 4, 5) disposed within the vat 20. The vat 20 may receive a basket (not shown) that holds food product within the heated cooking liquid (such as oil) to cook the food, and then can be removed to easily remove the food product from the cooking liquid. The fryer 10 may have a control panel 15 that allows for user inputs to control the cooking functions of the fryer 10. The control panel 15 may communicate with a control system 110 (shown schematically in FIG. 1), discussed below to automatically or manually operate the fryer 10 for manual or repeated cooking cycles (such as cycle the heater 18 to maintain cooking liquid Z temperature based upon measured liquid temperature or expected temperature).

Figure 4:
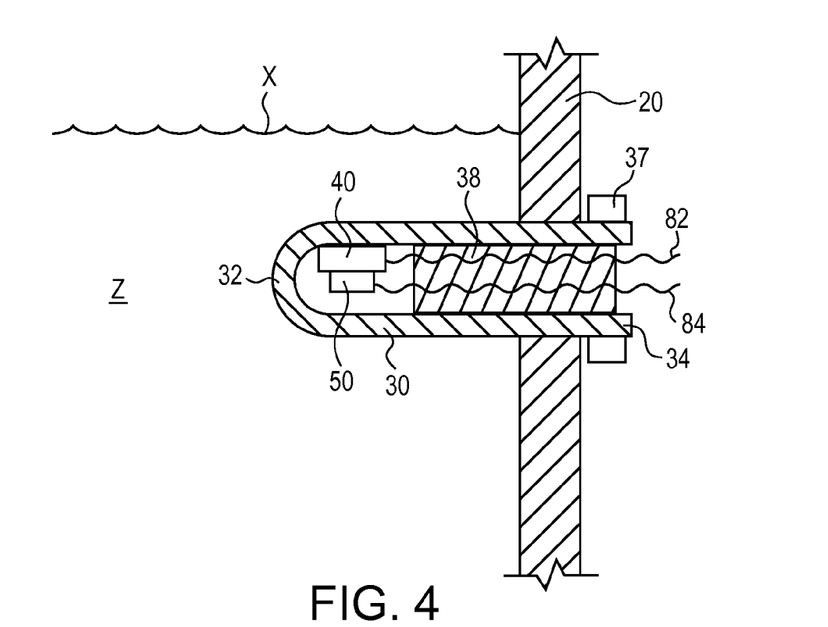
FIG. 4 is a side cross-sectional view of the cooking level detector system disposed within a vat showing a liquid level above the shell.
Figure 5:
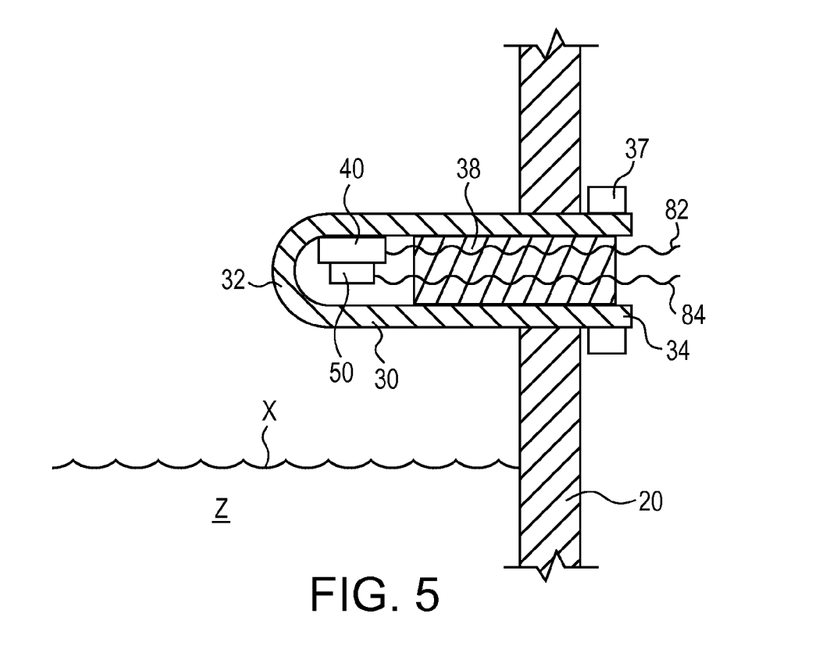
FIG. 5 is the view of FIG. 4 showing a liquid level below the shell.

As best shown in FIGS. 4-5, the cooking liquid level detection system may include a shell 30 that supports both a temperature sensor 50 and a heat producing element 40. In some embodiments, the shell 30 may be formed to extend within the cooking volume within the vat 20 and may fully enclose both the temperature sensor 50 and the heat producing element 40, such that the cooking liquid Z does not come into direct contact with either the temperature sensor 50 or the heat producing element 40.

Figure 3:
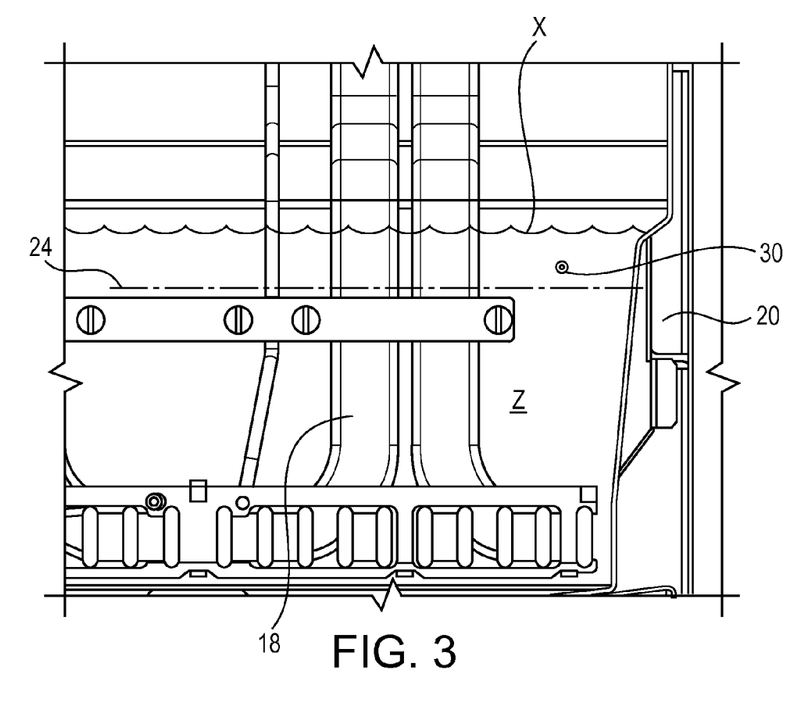
FIG. 3 is a front view of the view of FIG. 2.

In some embodiments, best shown in FIG. 3, the shell 30 may be disposed at or just above the desired minimum operational cooking liquid level 24 within the vat 20, to allow for a determination that cooking liquid Z is not in contact with the shell 30, as calculated by the control system 110, discussed below. This position of the shell 30 just above the desired minimum cooking liquid level within the vat 20 provides for an opportunity to add cooking liquid to the vat 20, either through an automated function as directed by the control system 110, discussed below, or through manual action, potentially upon receipt of an audible and/or visual low level alarm initiated by the control system 110.

In some embodiments, the shell 30 may include an insulation block 38 disposed to thermally isolate the heat producing element 40 and the temperature sensor 50 from the ambient through an open end 34 of the shell (where provided). Embodiments that include an insulation block 38 are calibrated with the assumption that no heat escapes (or only a certain amount or percentage of heat escapes as understood after experimental testing of the system within a vat 20 with cooking liquid Z) from the open end 34 of the shell 30. The insulation block 38 may be formed from one of many conventional materials with relatively low thermal conductivity. Alternatively, in other embodiments, the shell 30 may not include an insulation layer 38, with the control system 110, discussed below, calibrated based upon the experimentally determined amount of heat escaping the heat producing element 40 through the open end 34 of the shell 30. In still other embodiments, both opposite ends (32, 34) of the shell 30 may be sealed (with or without an insulation block 38 provided proximate to the end (similar to open end 34) extending out of the vat 20. The shell 30 may extend into the cooking volume through an aperture in a wall defining the vat 20 and be fixed to the wall defining the vat 20 with one or more fasteners 37 (shown schematically in FIGS. 4-5).

The heat producing element 40 may be disposed in surface-to-surface contact with an inner surface of the shell 30, such that a significant portion of the heat generated by the heat producing element 40, when energized by the control system 110, passes directly to the shell 30 through conduction heat transfer. The heat producing element 40 is preferably a resistance heater, which provides a known amount of heat in response to a known amount of current passing therethrough. Generally, the heat produced by a resistance is equivalent to the amount of current (squared) multiplied by the resistance of the heat producing element 40 ($I^2R$). Other types of known heaters that fit within a small, enclosed shell 30 and can be remotely operated based upon an electrical signal may be used instead of or in conjunction with a resistance heater. In some embodiments, the heat producing element 40 may be an RTD with a known or calibrated heat output.

It is preferable that the heat producing element 40 be disposed close to or in contact with the closed distal end 32 of the shell 30, to minimize the amount of heat transferred to the shell 30 that is transferred to the wall defining the vat 20 by conduction rather than to the cooking liquid Z through convection and conduction with the shell 30. One of skill in the art, after a thorough review of this specification, will appreciate the optimal length (or range of lengths) for the shell 30 extending within the vat 20 based upon the desire to minimize heat loss from the shell to the vat 20 through conduction, while also minimizing the distance that the shell 30 extends within the cooking volume to prevent the shell 30 from interfering with the basket position, a basket lift mechanism, a filtering mechanism, an oil removal mechanism, or other components that may be associated with or placed within the vat 20. The heat producing element 40 is electrically connected to the control system 110 with one or more wires 82, which provide a path for current between the control system 110 and the heat producing element 40 to energize the heat producing element 40.

In some embodiments, the type and rating for the heat producing element 40 is selected such that the heat generated by the heat producing element 40 is sufficient to establish a steady state temperature similar to a normal temperature of the liquid disposed within the vat 20. By way of example, in systems designed for use with a deep fat fryer, the heat producing element 40 may generate a sufficient amount of heat to maintain its temperature around 325-350 degrees F., which is part of or all of the range of normal oil temperatures in a commercial deep fat fryer.

The temperature sensor 50 is disposed within the shell 30 and in close proximity to one or more surfaces of the heat producing element 40, such that the temperature sensor 50 measures the surface temperature of the heat producing element 40. In some embodiments, the temperature sensor 50 is in contact with a surface of the heat producing element 40. The temperature sensor 50 may be an RTD (resistance temperature detector), or other compact electrical temperature detecting device. In some embodiments, the temperature sensor 50 may be of small size in comparison to the heat producing element 40, and the shell 30, such that the heat transfer from the heat producing element 40 to the temperature sensor 50 is small or negligible in comparison to the heat transfer to the shell 30 from the heat producing element 40. The temperature sensor 50 may be sized and positioned with respect to the heat producing element 40 such that the temperature measured by the temperature sensor 50 is based entirely, or almost entirely, upon the surface temperature of the heat producing element 40, and not based upon the temperature of the shell 30. In some embodiments, all or portions of the outer surface of the temperature sensor 50 not in contact with (or proximate to) the heat producing element 40 may be insulated to minimize the contribution of the sensed temperature by the shell 30 temperature (or ambient temperature within the shell 30).

The temperature sensor 50 may be electrically connected to the control system 110 with one or more wires 84. In some embodiments, the control system 110 receives a signal from the temperature sensor 50 that is proportional to or representative of the sensed surface temperature of the heat producing element 40. In some embodiments, the temperature sensor 50 may send a first signal that is proportional to, or representative of, the sensed surface temperature of the heat producing element 40 and a second signal that is proportional to or representative of a rate of change of the first signal (i.e. the rate of change of surface temperature). In other embodiments, the control system 110 may calculate the rate of change of temperature instead of the temperature sensor 50.

Figure 1:
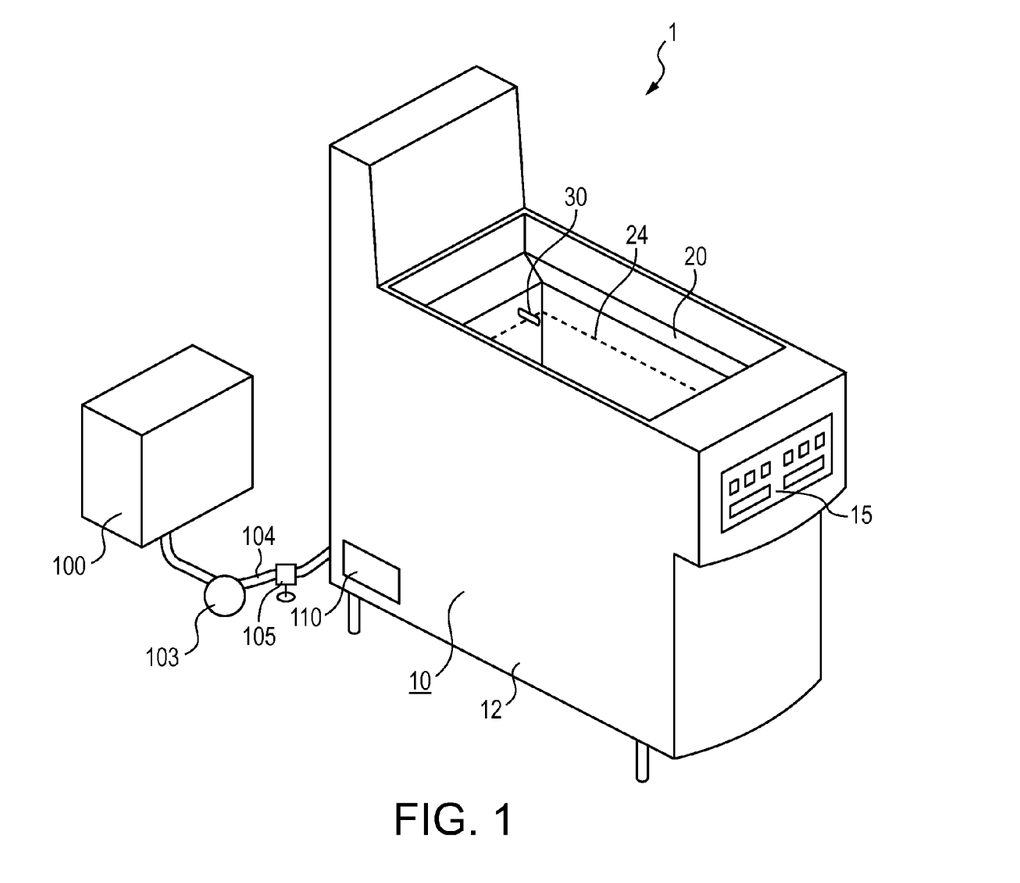
FIG. 1 is a perspective schematic view of a fryer using a cooking liquid level detection system.
Figure 2:
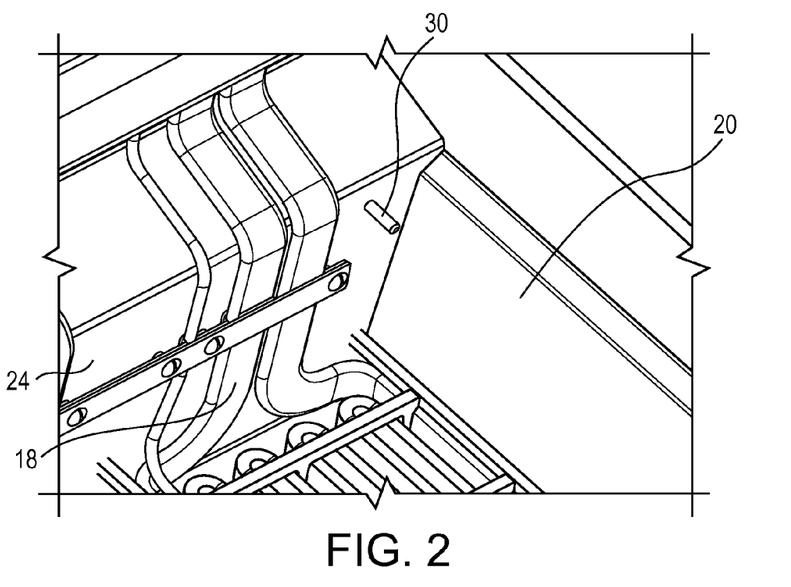
FIG. 2 is a perspective view within a vat of the shell of the level detection system.

The control system 110, is shown schematically in FIG. 1, and may control the operation of the fryer 10 (e.g. the cyclic operation of the heater 18) to maintain a measured oil temperature within a predetermined band, to time and count cooking cycles, etc. and may additionally control the operation of the cooking liquid level detection system. As mentioned above, the control system 110 is in communication with both of the heat producing element 40 (through electrical connection 82, shown schematically in FIGS. 4-5) and the temperature sensor 50 (through electrical connection 84, shown schematically in FIGS. 4-5). The control system 110 selectively provides a signal to energize and deenergize the heat producing element 40 and may also provide electrical power to operate the heat producing element 40. The control system may also provide operational power to and receive a signal from the temperature sensor 50 proportional to or representative of the surface temperature of the heat producing element 40. Alternatively, in some embodiments the heat producing element 40 may receive electrical power for operation from another source, but receive a signal to control the operation of the heat producing element 40 from the control system 110.

Figure 6:
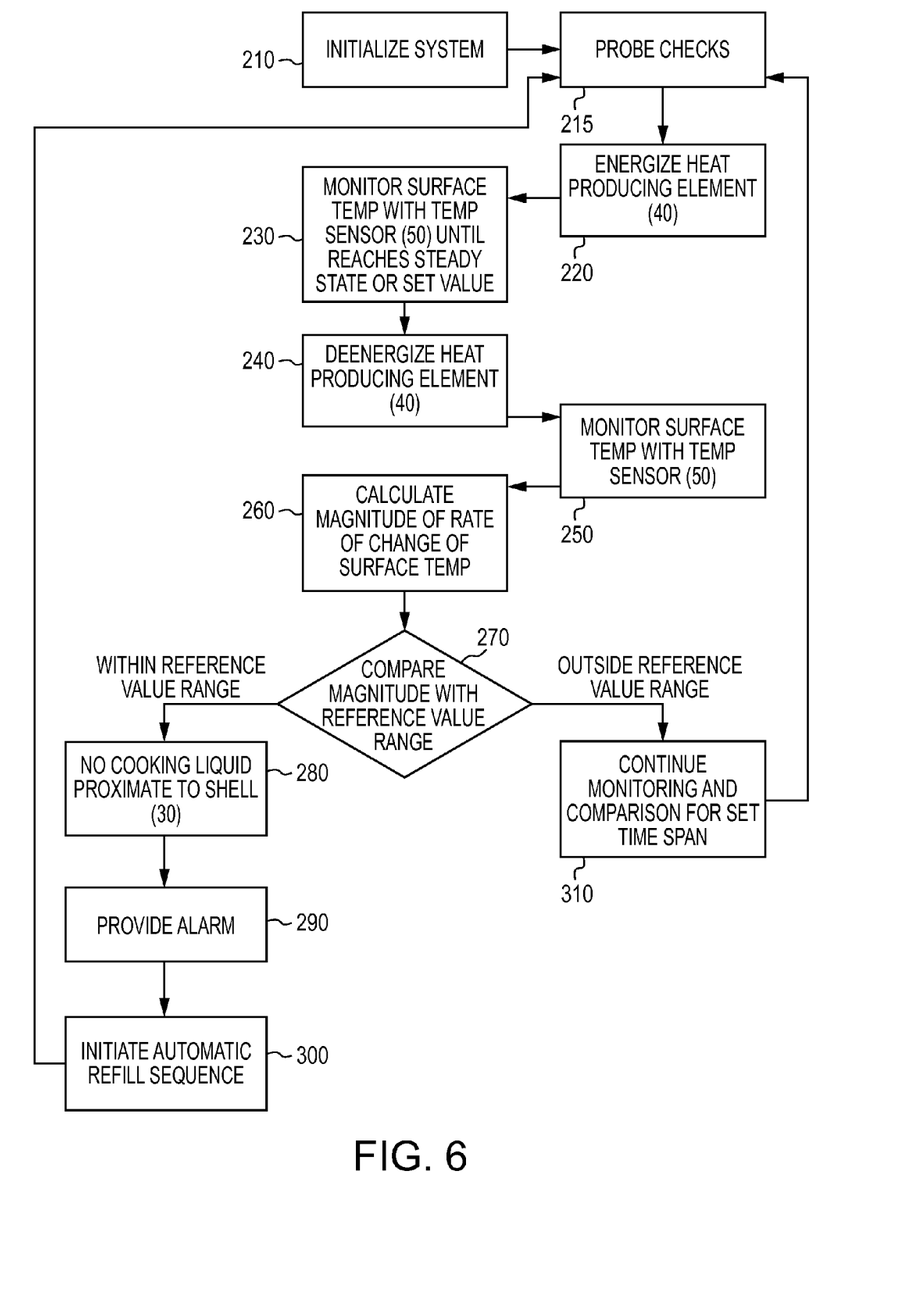
FIG. 6 is a flowchart showing the operational steps of the control system to control liquid level within the vat.

In some embodiments, the control system 110 follows the steps and performs the determinations depicted in FIG. 6, while in other embodiments the control system 110 may follow a different routine designed to perform one or more of the steps or functions described herein to use the level detection system disclosed herein.

Initially, or at the start of a new monitoring cycle, the control system 110 may initialize itself (step 210) and may perform one or more operational self-checks (such as power available, signal available, open or shorted temperature sensor 50 detection, etc.) (step 215). Next, in step 220 the control system 110 energizes the heat producing element 40 located within the shell 30, while measuring the sensed surface temperature of the heat producing element 40 as received by the temperature signal from the temperature sensor 50 (step 230). When the surface temperature of the heat producing element 40 reaches either a temperature setpoint (as stored within a memory source, or in a remote storage location in communication with the control system 110), such as a temperature setpoint close to or within the normal cooking liquid temperature range (generally 325-350 F), or when the heating sequence has reached a set time duration, the control system 110 deenergizes the heat producing element 40 (step 240). As will be understood, the temperature setpoint to secure the heat producing element 40 ("hot setpoint") may be a function of the various design and operational parameters of the fryer, such as oil temperature, ambient temperature, among other factors. In one specific embodiment, a temperature within the range of about 330-370 degrees Fahrenheit may be appropriate (inclusive off all temperatures within this range), while in other embodiments, specific values such as 350, 355, 358, 360 degrees Fahrenheit may be appropriate for the hot setpoint. Due to tolerances in the heat output of the heat producing element 40 and the tolerances and calibration of the sensor, this setpoint may vary within a temperature range.

After the heat producing element 40 is deenergized, the control system 110 continues to monitor the surface temperature of the heat producing element 40 (step 250) and additionally calculates the magnitude of the rate of change of surface temperature (step 260), or in embodiments where the temperature sensor 50 is capable of calculating this rate of change, receives a signal proportional to or representative of this rate of change of surface temperature. The control system 110 continuously compares the magnitude of the rate of change of surface temperature with a reference value, or a reference value range (step 270). In some embodiments, the control system 110 may compare the measured rate of change with a range of possible reference values, instead of a specific reference value due to the range of tolerances of the thermal output of a heat producing element 40, as well as tolerances or calibration of the sensor, which could cause the measured temperature and therefor the calculated rate of change to be affected. As can be understood, because the heat producing element 40 and the shell 30 are configured for efficient heat transfer therebetween, and rate of heat loss and the change in surface temperature (either due to heat loss from the shell 30 and heat producing element 40, or potential heat gain from the relatively hotter oil) is function of the presence of cooking liquid, or the absence of cooking liquid in contact with the outer surface of the shell 30. Because the heat producing element 40 was originally heated to a temperature close to the normal temperature cooking liquid, there will only be a small amount of heat flow through the shell when the heat producing element 40 is deenergized when the hot cooking liquid is in contact with the shell 30. This results in a very small rate of change in the surface temperature of the heat producing element 40, and therefore the control system 110 is programmed to conclude that there is cooking liquid present at the level of the shell 30, and the upper surface X (FIG. 4) of the cooking liquid Z is above the shell 30.

In contrast, when there is no hot cooking liquid proximate to, or, in contact with the shell 30, the shell 30 contacts the ambient air that is at room temperature (or at an increased temperature, but significantly less than oil temperature). In this situation there is a large heat flux from the shell 30 to the ambient (due to the difference in temperature therebetween), and therefore a large heat flux from the heat producing element 40 to the shell 30 and ultimately to the ambient. This large heat flux causes the surface temperature of the heat producing element 40 to decrease rapidly, causing the temperature sensor 50 to sense a large magnitude of the rate of change of surface temperature (step 260). When the magnitude of the rate of change of surface temperature is within a reference value range that is indicative of a significant heat loss from the heat producing element 40 and shell 30 (either programmed into the control system 110 or in communication with the control system 110) the control system 110 makes the determination that the cooking liquid is not in contact with the shell 30 (step 280), and the upper surface X is below the shell 30 (FIG. 5). As will be appreciated by one of ordinary skill in the art with reference to this disclosure, an appropriate reference value range may be a function of various design parameters of the fryer, such as the geometry of the vat, the normal temperature of the cooking fluid, the expected ambient temperature, the normal level of the shell 30 within the vat, among other factors.

Accordingly, because the system identifies a low cooking liquid condition, the control system 110 may provide an audible and/or visual alarm (step 290) and may initiate an automatic refill sequence (step 300). As shown schematically in FIG. 1, the fryer 10 and specifically the vat 20 may be fluidly connected to a source of cooking liquid such as in a holding tank 100, which may be either pumped to the vat 20 or allowed to gravity drain to the vat 20. In situations where the control system 110 automatically directs replacement cooking liquid to the vat 20, the control system 110 may operate a pump 103 that takes suction from the holding tank 100 and directs replacement liquid to the vat 20, and may open one or more isolation valves 105 to allow cooking liquid to refill the vat 20. Upon completion of the cooking liquid refill cycle (as measured by one or more of elapsed time, change in level of the holding tank 100, or by other parameters), the control system 110 may start the level measurement cycle again (step 210). In some embodiments, upon a determination that the liquid level X is below the shell 30, the control system 110 may deenergize the heaters 18 within the vat 20, and reenergize (to return to the normal heating cycle) when liquid level returns to the normal band. In some embodiments, after the liquid refill cycle 300, the system initiates a delay (such as a 3-5 minute delay) which allows the system to thermally stabilize before the heat producing element 40 again performs probe checks (step 215) and energizes the probe again (step 220).

Alternatively, in situations where the calculated rate of change is outside the reference value range (with a lower magnitude than the reference value range), the control system 110 continues to monitor the surface temperature of the heat producing element 40 (repeating step 250), calculating the rate of change of surface temperature (repeating step 260) and comparing that measured rate of change with the reference value range (step 270), collectively step 310. The control system 110 may additionally start a clock with the completion of the first comparison step (270) that continues to run as step 310 continues to be performed. If the rate of change remains outside the reference value range, the monitoring and comparison step (310) may end after a specific time measured by the clock and the system reverts to the probe checks (step 215). If the surface temperature decreases to a low temperature setpoint of the heat producing element 40, the system also automatically reverts to the probe checks (step 215). Similar to the hot setpoint referenced above, the "cool setpoint" for the measured setpoint may be within a range of temperatures, such as between 200 to 275 degrees Fahrenheit (inclusive of all temperatures therewithin). In some embodiments, the cool setpoint may be 245, 250, 255, or 260 degrees Fahrenheit.

While the preferred embodiments have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A deep fat fryer, comprising:
a vat suitable to hold a volume of cooking liquid, the vat in thermal communication with a heat source and configured to provide heat to the cooking liquid when disposed within the vat, and
a liquid level detector disposed within the vat, the liquid level detector comprising a heat producing element and a temperature sensor disposed proximate to the heat producing element and configured to provide a first output signal representative of a surface temperature of the heat producing element, wherein the detector comprises a shell that supports and encloses the temperature sensor and the heat producing element,
further comprising a control system in communication with the temperature sensor and the heat producing element, the control system configured to monitor the first output signal from the temperature sensor and selectively energize and deenergize the heat producing element, wherein the control system is operatively connected with a pump and the vat is fluidly connected with the pump, wherein the control system is configured to selectively provide a second signal to operate the pump to urge cooking liquid to flow to the vat to increase the volume of cooking liquid within the vat.

2. The fryer of claim 1, wherein the shell provides a barrier to prevent cooking liquid disposed within the vat from contacting the temperature sensor and the heat producing element.

3. The fryer of claim 1, wherein the temperature sensor contacts the heat producing element.

4. The fryer of claim 1, wherein the heat producing element contacts the shell to allow for conductive heat transfer therebetween.

5. The fryer of claim 1, wherein the control system is configured energize the heat producing element and then deenergize the heat producing element while monitoring the first output signal from the temperature sensor after the heat producing element is deenergized.

6. The fryer of claim 5, wherein the control system is configured to determine a presence or absence of cooking liquid proximate to the liquid level detector based upon a measured rate of change of the first output signal from the temperature sensor after the heat producing element is deenergized.

7. The fryer of claim 6, wherein the controller is configured to detect an absence of liquid proximate to the liquid level detector when a magnitude of the rate of change of the first output signal is within a reference value range.

8. The fryer of claim 1, wherein the liquid level detector is positioned within the vat proximate to a lowest desired level of cooking liquid within the vat.

9. The fryer of claim 1, wherein the heat producing element is configured to generate a sufficient flux of heat to establish a steady state temperature similar to a normal temperature of the liquid normally disposed within the vat.

10. A detector configured to indirectly monitor a level of liquid within a container, comprising:
a temperature sensor;
a heat producing element proximate to the temperature sensor; and
a shell disposed around the temperature sensor and heat producing element, the shell configured to be disposed within a container and to provide a barrier between liquid disposed within the container and each of the temperature sensor and heat producing element,
wherein the heat producing element is configured to transfer heat generated therein to the shell, and the temperature sensor is configured to measure a surface temperature of the heat producing element and the temperature sensor generates a first output signal that is representative of the measured surface temperature,
further comprising a controller that receives the first output signal, wherein a rate of change first output signal is calculated, wherein the controller that is configured to determine a presence or an absence of liquid proximate to the shell based upon the rate of change of the first output signal during a time period after the heat producing element is deenergized, wherein the controller is configured to detect the absence of liquid proximate to the liquid level detector when the magnitude of the rate of change of the first signal during the time period after the heat producing element is deenergized is within a reference value range.

11. The detector of claim 10, wherein the heat producing element makes surface contact with the shell to allow for conductive heat transfer therebetween.

12. The detector of claim 10, wherein the heat producing element is configured to generate a flux of heat to establish a steady state temperature similar to a normal temperature of a liquid normally disposed within the container.

13. The detector of claim 10, wherein the heat producing element and the shell are configured such that heat loss from the shell and the heat producing element is larger when the shell is not in contact with liquid than when the shell is in contact with cooking liquid at normal cooking temperature.

14. The detector of claim 10, wherein the controller is configured to monitor the first output signal and selectively energize and deenergize the heat producing element to maintain the first output signal within a predetermined range.

15. The detector of claim 10, wherein the rate of change of the first output signal is calculated by the controller.

16. A method of controlling a level of liquid within a cooking vat, comprising:
    providing a vat configured to receive a volume of liquid;
    providing a liquid level detector within the vat, the liquid level detector comprising a heat producing element and a temperature sensor disposed proximate to the heat producing element and configured to provide a first output signal representative of a surface temperature of the heat producing element;
    providing a controller that selectively energizes and deenergizes the heat producing element, and receives the first output signal;
    energizing the heat producing element;
    deenergizing the heat producing element after the first output signal reaches either a predetermined value or a substantially steady state value;
    measuring the rate of change of the first output signal after the heat producing element is deenergized;
    comparing the measured rate of change of the first output signal with a reference value range; and
    determining the presence or absence of liquid proximate to the liquid level detector based upon the comparison between the measured rate of change of the first output signal and the reference value range.

17. The method of claim 16, wherein the controller determines the absence of liquid proximate to the liquid level detector when a magnitude of the rate of change of the first output signal is within the reference value range.

18. The method of claim 17, further comprising the step of initiating a liquid fill sequence upon determining the absence of liquid proximate to the liquid level detector.

19. The method of claim 18, wherein the liquid level detector further comprises a shell surrounding the heat producing element and the temperature sensor, the shell establishing a heat transfer path between the heat producing element and liquid disposed within the vat.

20. The method of claim 18, further comprising the step of providing the liquid level detector within the vat at a position proximate to a lowest desired level of cooking liquid within the vat.

21. A deep fat fryer, comprising:
    a vat suitable to hold a volume of cooking liquid, the vat in thermal communication with a heat source and configured to provide heat to the cooking liquid when disposed within the vat, and
    a liquid level detector disposed within the vat, the liquid level detector comprising a heat producing element and a temperature sensor disposed proximate to the heat producing element and configured to provide a first output signal representative of a surface temperature of the heat producing element,
    further comprising a control system in communication with the temperature sensor and the heat producing element, the control system configured to monitor the output signal from the temperature sensor and selectively energize and deenergize the heat producing element, wherein the control system is configured energize the heat producing element and then deenergize the heat producing element while monitoring the first output signal from the temperature sensor after the heat producing element is deenergized,
    wherein the control system is configured to determine a presence or absence of cooking liquid proximate to the liquid level detector based upon a measured rate of change of the first output signal from the temperature sensor after the heat producing element is deenergized, wherein the controller is configured to detect an absence of liquid proximate to the liquid level detector when a magnitude of the rate of change of the first signal is within a reference value range.

22. The fryer of claim 21, wherein the temperature sensor contacts the heat producing element.

23. The fryer of claim 21, wherein the heat producing element contacts the shell to allow for conductive heat transfer therebetween.

24. The fryer of claim 21, wherein the liquid level detector is positioned within the vat proximate to a lowest desired level of cooking liquid within the vat.

25. The fryer of claim 21, wherein the control system is operatively connected with a pump and the vat is fluidly connected with the pump, wherein the control system is configured to selectively provide a second signal to operate the pump to urge cooking liquid to flow to the vat to increase the volume of cooking liquid within the vat.

26. The fryer of claim 21, wherein the heat producing element is configured to generate a sufficient flux of heat to establish a steady state temperature similar to a normal temperature of the liquid normally disposed within the vat.

* * * * *

UNITED STATES PATENT AND TRADEMARK OFFICE
CERTIFICATE OF CORRECTION

| | |
|---|---|
| PATENT NO. | : 9,357,881 B2 |
| APPLICATION NO. | : 13/804124 |
| DATED | : June 7, 2016 |
| INVENTOR(S) | : John P. Gardner et al. |

Page 1 of 1

It is certified that error appears in the above-identified patent and that said Letters Patent is hereby corrected as shown below:

In the Claims

In column 10, claim 21, line 24, after "control system is configured" insert --to--.

Signed and Sealed this
Twenty-sixth Day of July, 2016

Michelle K. Lee
*Director of the United States Patent and Trademark Office*